(12) United States Patent
Wilson et al.

(10) Patent No.: US 12,263,462 B2
(45) Date of Patent: Apr. 1, 2025

(54) MATERIAL TO SEPARATE AND PUMP OXYGEN

(71) Applicants: Steven Wilson, Phoenix, AZ (US); Christopher Muhich, Phoenix, AZ (US); Ellen B. Stechel, Albuquerque, NM (US); Ivan Ermanoski, Tempe, AZ (US)

(72) Inventors: Steven Wilson, Phoenix, AZ (US); Christopher Muhich, Phoenix, AZ (US); Ellen B. Stechel, Albuquerque, NM (US); Ivan Ermanoski, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 408 days.

(21) Appl. No.: 17/396,238

(22) Filed: Aug. 6, 2021

(65) Prior Publication Data
US 2022/0040666 A1    Feb. 10, 2022

Related U.S. Application Data

(60) Provisional application No. 63/063,582, filed on Aug. 10, 2020.

(51) Int. Cl.
*B01J 20/18*    (2006.01)
*B01J 20/02*    (2006.01)
*B01J 20/28*    (2006.01)
*B01J 20/34*    (2006.01)

(52) U.S. Cl.
CPC .......... *B01J 20/18* (2013.01); *B01J 20/0207* (2013.01); *B01J 20/0211* (2013.01);
(Continued)

(58) Field of Classification Search
CPC .... B01J 20/18; B01J 20/0207; B01J 20/0211; B01J 20/0218; B01J 20/0222;
(Continued)

(56) References Cited

U.S. PATENT DOCUMENTS 6,087,289 A * 7/2000 Choudary ............. B01D 53/02
                                                                95/902
7,319,082 B2    1/2008 Jasra et al.
(Continued)

FOREIGN PATENT DOCUMENTS

WO    WO 2010/079324 A1 *    7/2010

OTHER PUBLICATIONS

Peter, S.A et al., "Selective Adsorption of Oxygen over Argon in Alkaline-Earth-Metal Cation-Exchanged Zeolite X," Industrial & Engineering Chemistry Research, vol. 49, No. 16, Jul. 2010, American Chemical Society, pp. 7524-7529.

*Primary Examiner* — Joseph D Anthony
(74) *Attorney, Agent, or Firm* — Withrow & Terranova P.L.L.C.

(57) ABSTRACT

A material for separating and pumping oxygen is disclosed. The material is a zeolite doped with a chemical element having an electron density of between 30 kJ/mol and 150 kJ/mol. The material is configured for controllable oxygen desorption between 150° C. and 300° C. and pumping the released oxygen into an area having an ambient pressure of less than 100 pascals.

15 Claims, 15 Drawing Sheets

(52) U.S. Cl.
CPC ....... *B01J 20/0218* (2013.01); *B01J 20/0222* (2013.01); *B01J 20/0225* (2013.01); *B01J 20/0248* (2013.01); *B01J 20/0251* (2013.01); *B01J 20/0292* (2013.01); *B01J 20/2808* (2013.01)

(58) Field of Classification Search
CPC ................ B01J 20/0225; B01J 20/0248; B01J 20/0251; B01J 20/0292; B01J 20/2808; B01J 20/3483; B01J 20/186
See application file for complete search history.

(56) References Cited

U.S. PATENT DOCUMENTS

| | | | |
|---|---|---|---|
| 2005/0090380 A1* | 4/2005 | Jasra | B01J 37/06 502/79 |
| 2013/0245322 A1* | 9/2013 | Raja | B01J 35/002 564/267 |
| 2015/0375218 A1* | 12/2015 | Koseoglu | B01J 21/12 502/68 |
| 2016/0101415 A1* | 4/2016 | Ji | C07C 1/20 423/700 |
| 2016/0167030 A1* | 6/2016 | Levy | B01J 37/03 540/464 |
| 2017/0233312 A1* | 8/2017 | Hossain | C07C 5/42 585/656 |
| 2017/0297978 A1* | 10/2017 | Hossain | B01J 21/04 |
| 2019/0022630 A1* | 1/2019 | Koseoglu | B01J 23/755 |
| 2019/0224653 A1* | 7/2019 | Koseoglu | B01J 21/12 |

* cited by examiner

|  | No O2 | O2 in Void | O2 near Co |
|---|---|---|---|
| Fermi Energy (eV) | -1.06 | -0.99 | 0.11 |
| Co Bader CHG (eV) | 7.44 | 7.46 | 7.47 |
| Moleculer O Atom1 Bader $\Delta$CHG (eV) | 6.08* | 0.05 | 0.05 |
| Moleculer O Atom2 Bader $\Delta$CHG (eV) | 5.94* | -0.03 | -0.06 |
| Zeolite Lattice O Atom 8 $\Delta$CHG (eV) | 7.16 | 0.04 | -0.18 |
| Zeolite Lattice O Atom 16 $\Delta$CHG (eV) | 7.34 | -0.10 | 0.01 |
| Zeolite Lattice O Atom 35 $\Delta$CHG (eV) | 7.42 | -0.08 | 0.09 |
| Zeolite Lattice O Atom 43 $\Delta$CHG (eV) | 7.36 | 0.01 | 0.02 |
| Zeolite Lattice O Atom 33 $\Delta$CHG (eV) | 7.69 | 0.01 | 0.13 |

FIG. 6D

MATERIAL TO SEPARATE AND PUMP OXYGEN

RELATED APPLICATIONS

This application claims the benefit of provisional patent application Ser. No. 63/063,582, filed Aug. 10, 2020, the disclosure of which is hereby incorporated herein by reference in its entirety.

GOVERNMENT SUPPORT

This invention was made with government support under DE-EE0008991 awarded by the Department of Energy. The government has certain rights in the invention.

FIELD OF THE DISCLOSURE

The present disclosure relates to gas separation and pumping and in particular to oxygen separation and pumping used in applications that include but are not limited to chemical looping, partial oxidation of methane, medical applications, and solar hydrogen production.

BACKGROUND

Oxygen ($O_2$) sorption materials can be used as a means for either producing a low partial pressure of oxygen ($P_{O2}$) environment for chemical processes or in the production of $O_2$ rich gas (>21%) from leaner $O_2$ gas streams ($O_2$ composition <21% down to $P_{O2}$<10 Pa or lower). Oxygen removal and $O_2$ enrichment are critical processes in many industrial applications, such as chemical looping, thermochemical fuel generation, partial oxidation processes such as of methane, and $O_2$ production. Current mechanical oxygen pumping equipment is energy intense and does not provide any separation properties. Current $O_2$ separation techniques such as cryo-distillation have high cooling energy requirements and do not pump. A recent solution to these problems was the application of bulk materials for the chemical looping-based oxygen separations. These bulk materials, such as perovskites, require elevated operating temperatures (>250° C.) to facilitate oxygen exchange with the bulk. Although this has traded the form of energy required to drive the process, from electricity to heat, the high operating temperatures still incur a large thermodynamic energy penalty compared with operation at room temperature. As such, there is a need for material to separate and pump oxygen with relatively much greater efficiency than traditional materials and processes.

SUMMARY

A material for separating and pumping oxygen is disclosed. The material is a zeolite substitution with a chemical element having additional electrons beyond that of the replaced element (i.e., additional oxidation states), which provides an oxygen adsorption energy of between 30 kJ/mol and 150 kJ/mol, or higher. The material is configured for controllable oxygen desorption between 150° C. and 300° C. and pumping the oxygen from pressures down to 100 pascals, or lower, into an area having an ambient pressure or higher. In some embodiments, the zeolite is configured to pump oxygen by way of desorption into an area having an ambient pressure of more than 100 pascals.

Those skilled in the art will appreciate the scope of the present disclosure and realize additional aspects thereof after reading the following detailed description in association with the accompanying drawings.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 6D shows bader analysis for Co site 3 doped ALPO-5 $O_2$ adsorption (the base bader charge is pulled from a separate calculation done on an $O_2$ alone in vacuum).

DETAILED DESCRIPTION

Figure 1:
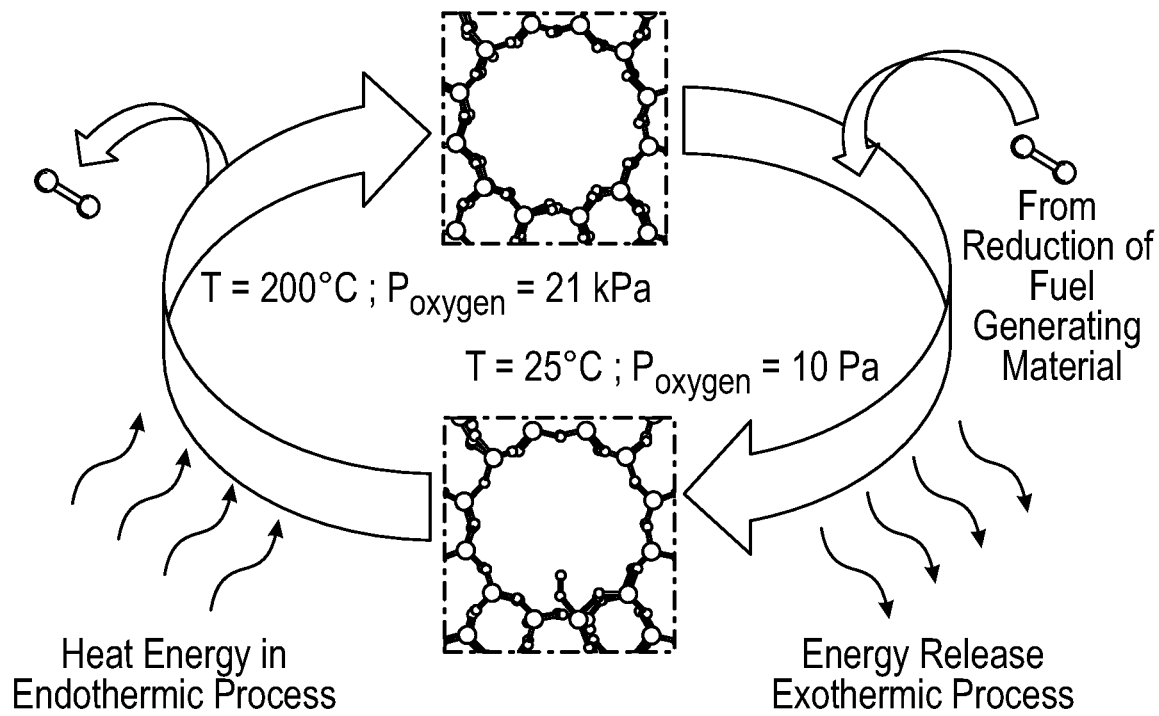
FIG. 1 is a diagram showing a thermochemical sorption pump process in which oxygen ($O_2$) is adsorbed at low oxygen partial pressures (<100 Pa) and released at ambient temperature.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Oxygen separation and pumping is a critical chemical process across a wide array of chemical processes, for example, in chemical looping, partial oxidation of methane, medical applications, and solar hydrogen production. Oxygen ($O_2$) generation and separation is usually conducted by electrolysis or cryogenic means. Pumping, or increasing the pressure, relies on inefficient mechanical means. In this disclosure the terms doped and substituted are used interchangeably and are defined as the exchange of an atom in base zeolite structure with an element that is not necessary for the formation of the zeolite structure. The present disclosure relates to a material, doped or substituted zeolites, to simultaneously separate and pump oxygen, based on high surface area, porous materials, and a sorption/desorption process. In the system according to the present disclosure, $O_2$ adsorbs to the zeolite, even when the $O_2$ is present at low (1 Pa) pressures. This separates the $O_2$ from the surrounding gas, if present. In the second pumping step, the temperature is increased, driving thermal $O_2$ desorption and thus regenerating the material to start the cycle again. The $O_2$ desorption pressure depends on the temperature, and thus a higher final partial oxygen pressure ($P_{O2}$) can be achieved by increasing the desorption temperature. Conventional zeolites are incapable of performing this action because $O_2$ does not adsorb in their pores. The inclusion of dopants or substitution, such as transition metals and semi-metals, with a high energy electron density into the zeolite enables $O_2$ adsorption. The pumping capacity depends on the number of dopant sites, whereas the pumping strength, that is, the lowest $O_2$ partial pressure from which $O_2$ can be extracted and the temperature and $O_2$ partial pressure at which $O_2$ is released, can be selected by choosing different dopants. This was demonstrated computationally using the ALPO-5 zeolite with an array of dopants including silicon, titanium, chromium, manganese, zirconium, molybdenum, palladium, tin, cerium, praseodymium, hafnium, tungsten, and platinum. A similar strategy has been taken with other zeolites including ETS-10 to demonstrate that this strategy is not restricted to ALPO-5. Thus the method of the present disclosure is implementable across most, if not all, zeolites.

Separating $O_2$ from other gases and/or pumping said $O_2$ is a critical unit operation in many chemical processes. The present disclosure relates to a material capable of facilitating ambient or near ambient (<300° C., or higher) sorption/desorption-based chemical separation and pumping of $O_2$ from low oxygen partial pressure (to 1 Pa $O_2$ or lower) to ambient oxygen partial pressures or higher (e.g., 21% $O_2$). The material has a high surface area and is selective to $O_2$ over nitrogen ($N_2$) and water ($H_2O$), meaning that the material is usable with ambient air or in processes which contain moisture. The energy input is only that required to heat the material from the adsorption temperature (nominally room temperature, but this can be selected) to the desorption temperature (nominally 150° C.) and to overcome the heat of adsorption. Thus, low-quality heat, such as rejected process heat, is sufficient to drive this process.

The use of the $O_2$ sorption material disclosed herein in lieu of other processes could substantially increase system efficiency in industrial settings. Depending on its incorporation within the system, the material does not require any pumping mechanisms, the material does not require a significant amount of heat to reactivate the material as do materials currently on the market. The material can be used for oxygen reforming of hydrocarbons such as methane, oxyfuel combustion plants, industrial $O_2$ production, chemical looping systems such as solar thermochemical water and carbon dioxide splitting, $O_2$ "getter" applications, and others application in which $O_2$ is required to be delivered or to be removed.

The present disclosure relates to the feasibility of $O_2$ sorption materials as a means for maintaining the required low oxygen partial pressures ($PO_2$<100 Pa) needed in solar thermochemical fuel generation via chemical looping of metal oxides. The current low-efficiency systems that are in place, inert gas sweeping and mechanical pumping, are an energy drain of the overall system and directly increase the cost per kilowatt of production. Sorption pumps are a means to mitigate this loss by replacing the mechanical process with another thermochemical loop that can be powered from waste thermal energy from the fuel production phase. Unlike bulk perovskite systems, zeolites offer a high surface area of adsorption without the need for oxygen to dissociate and diffuse through any crystal lattice, making them ideal for use as sorption pumps. In the system according to the present disclosure, $O_2$ is adsorbed at room temperature, and then using readily available waste thermal heat, the zeolite temperature is raised to drive off the $O_2$ and regenerate the pumping capacity. Ab initio calculations were used to elucidate the use of zeolites for oxygen pumping. Calculations indicate that selective doping of transition metals and semi-metals into the AFI zeolite structure ALPO-5 provides six unique sites for $O_2$ chemical adsorption. The target for optimum thermal efficiency is a 0.41-1.00 eV (40-100 kJ/mol) regime. Platinum was used as a proof of concept cation replacement in six unique sites for catalyzing $O_2$ adsorption into an otherwise dormant structure. Two sites resulted in negative adsorption energies of −0.91 eV. The success of doping with platinum indicates that other, less expensive dopants maybe found inside the 0.41-1.00 eV range. Additional suitable dopants, for example, tin, germanium, chromium, and vanadium, that meet this criterion have been identified.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

Materials Preparation

The present disclosure relates to the need for a material with (1) a relatively low oxygen ($O_2$) adsorption energy (30 kJ/mol to 140 kJ/mol) so that $O_2$ release occurs at moderate temperatures (<300° C.), (2) a surface $O_2$ exchange rather than a bulk $O_2$ exchange so that $O_2$ diffusion is minimized or eliminated, and (3) a high surface area to maximize the number of active sites and to minimize the energy required for heating to release the $O_2$. The surface area and exchange concept lead to the consideration of zeolites. However, despite the large number of zeolite structures which are possible, they are inert to $O_2$ adsorption. Recognizing that $O_2$ adsorption requires a high energy electron density to form bonds on the surface, doping, or substitution, of the zeolite structure with metals, or semi-metals, or transition metals, that possess high energy electron density was attempted. The concept was tested via ab initio (density functional theory) calculations using the ALPO-5 zeolite as a proof of concept. A large array of metal dopants were found to provide for $O_2$ adsorption in the energy range of interest (30 kJ/mol to 110 kJ/mol).

In particular, the present disclosure relates to the zeolites that have been doped with high energy electron density elements that are capable of sorbing $O_2$. The disclosed method holds true across zeolite type and multiple dopants. The dopant identity is chosen based on the partial pressure of $O_2$ in stream to be stripped of $O_2$ (i.e., the low pressure side of the pump). Higher sorption strength dopants such as tungsten or zirconium are to be used under very low partial pressure of oxygen ($P_{O2}$) conditions, whereas less stringent conditions such as $P_{O2}$~100 Pa can use lower binding strength doping such as tin (Sn) or chromium (Cr).

The material can be synthesized as follows: Normal zeolite preparations methods are used to form the desired zeolite, for example, ALPO-5. Then, using an ion exchange method, aluminum (Al) is removed from the structure and replaced by the dopant, for example, Sn. This then results in the doped material. A second route is forming a conducting conventional hydrothermal zeolite preparation while including appropriate dopant salts or organometallics. For example, sub-stoichiometric Al salts, or organometallics, are used with the appropriate molar quantity of Sn salt or organometallics making up the differences. Several other synthesis methods could be used.

Implementation of the Material in a System

Once synthesized, the material pumps and separates oxygen through the following process.

(1) The doped zeolite material is exposed to a gas stream containing $O_2$ (the stream to be pumped) at a low temperature (−20° C. to 80° C.), for example, by opening a valve to the zeolite chamber or flowing the stream over the material.

(2) Oxygen adsorbs to the zeolite surface driven by the exothermic $O_2$ adsorption reaction.

(3) When desired, the material is isolated from the original stream to prevent recontaminating the material.

(4) Once isolated from the original stream, and perhaps in contact with air, the material with adsorbed $O_2$ is heated to the $O_2$ desorption temperature (100° C. to 300° C.) whereby the $O_2$ releases.

(5) The $O_2$ is removed from the system either by a sweep gas, for example, air, or by a pressure difference between the evolving $O_2$ and the surrounding environment.

(6) The material is isolated from the exhausting environment and cooled back to the pumping temperature.

(7) The cycle is repeated.

Doped zeolite structures offer $O_2$ adsorption energies for room temperature separations and pumping applications requiring an operating temperature range of −20° C. to −200° C. The material has an intermediate $O_2$ adsorption energy namely 30-150 kJ/mol, which enables the near ambient operational window. The $O_2$ can be removed from low $P_{O2}$ environments ($PO_2$<100 Pa) and supplied at ambient pressure or above. The material requires only low quality, that is, low temperature, heat to operate.

Most $O_2$ separations and pumping are currently completed by cryogenic distillation and mechanical means, which are costly and inefficient. These means also require the use of a high amount of electricity. Current sorption-based technologies for $O_2$ adsorption materials are bulk perovskites or spinel structures requiring the dissociation and diffusion of $O_2$ into the lattice. The performance of such a system is limited by the adsorption material properties, namely, the $O_2$ sorption enthalpy and entropy, which dictate the lower $P_{O2}$ limit achievable, regeneration temperature, and sorption capacity. Dissociation and diffusion of oxygen is slow at room temperature, thus requiring operation at elevated temperatures greater than 200° C. This, in turn, results in higher energy inputs into the overall system, causing a steep efficiency drop in cost per energy generation. Doped zeolite structures do not require dissociation or diffusion to adsorb $O_2$ onto the surface and allow for a much lower operating temperature range, which directly results in overall system application efficiency gains.

Solar thermochemical fuel generation via chemical looping of metal oxides has the potential for high solar conversion efficiencies because energy from the entire solar spectrum is used and the heat directly drives the chemical reactions. In general, these reactions are summarized as follows:

$$MO_x + \text{heat} \rightarrow MO_{x-1} + \tfrac{1}{2}O_2 \qquad \text{EQ. 1}$$

$$MO_{x-1} + CO_2 \rightarrow MO_x + CO \qquad \text{EQ. 2}$$

$$MO_{x-1} + H_2O \rightarrow MO_x + H_2 \qquad \text{EQ. 3}$$

To operate at temperatures less than 2,000° C., a low oxygen partial pressure ($P_{O2}$<100 Pa) must be maintained during reduction. This has conventionally been provided by mechanical pumping or the use of an inert sweep gas. Both methods are a major source of energy loss in the system since mechanical pumping is very inefficient, particularly at pressures below 100 Pa, and large quantities of sweep gas are required to maintain such low $P_{O2}$. In the case of inert gas sweeping, energy is consumed either by the production of the gas on site or the purification and recycling of the inert gas, both of which require methods of pumping that scale with the size of the system (amount of inert gas needed). This method of oxygen ($O_2$) removal has an estimated realistic efficiency around 20% to 25% with some reports of up to 40% efficiency in ideal conditions. As for mechanical pumping, efficiency drops as lower partial pressures of oxygen are reached, falling to <5% when pressures are below 10 Pa.

Sorption pumps are a route to removing $O_2$ from the system and therefore could replace the inefficient mechanical pump and sweep gas of solar-thermochemical water splitting systems. In this use, the reducing solar fuel material (SFM) to be scrubbed of $O_2$ is exposed to another thermochemical sorption material (TSM), physically separated but systematically connected. At this stage, the TSM is at a low temperature and $P_{O2}$. The $O_2$ is adsorbed to the surface of the high surface area TSM, thus driving a $P_{O2}$ difference between the SFM and TSM. Then, during the oxidation step of the SFM, using readily available waste thermal heat, the temperature of the TSM is raised, driving off the $O_2$ and regenerating the pumping capacity. FIG. 1 is a diagram showing a thermochemical sorption pump process in which oxygen ($O_2$) is adsorbed at low oxygen partial pressures (<100 Pa) and ambient temperature. The diagram shows that readily available waste heat is used to drive off absorbed $O_2$ at elevated temperatures and ambient pressures.

The efficiency gain from the use of a TSM lies in the absence, or great reduction, of the required pumping equipment associated with both sweep gas and vacuum pumping. Furthermore, the use of a TSM has been shown to significantly increase the reduction extent of the SFM, However, it must be noted that the exact implementation of the TSM within the solar conversion cycle dictates the true cycle efficiency gain. Likewise, careful selection of the sorption material is needed to optimize performance and meet the desired operating conditions, which can vary from one application to the next.

The performance of such a system is limited by the adsorption material properties, namely, the $O_2$ sorption enthalpy and entropy, which dictate the lower $P_{O2}$ limit achievable, regeneration temperature, and sorption capacity. Currently, available materials for oxygen pumping are based on perovskite and spinel structures, where the $O_2$ exchange happens in the bulk of the material. The performance of these structures is usually limited by the dissociation and diffusion of $O_2$ through the solid, which is slow at room temperature, thus requiring operation at elevated temperatures (>200° C.). Another downfall noted in these materials is the required inert environment for the reduction step to proceed in these materials. However, one case has been found in which a bulk material ($YCr_{1-x}P_xO_{4-\delta}$) has shown a relatively low temperature for adsorption (50° C.) due to elevated diffusion of oxide ions created by high concentrations of oxygen vacancies. The abundance of vacancies allows for vacancy-mediated hopping of the oxide ions causing CrV and CrIV active sites. Be that as it may, the temperature required to drive off the adsorbed oxygen and reactivate the material is T≥400° C.; furthermore, the reported heating and cooling cycle was conducted under ambient pressure conditions.

A simple thermodynamic model aims at identifying the key characteristics (binding energy, activation temperature/pressure, and surface area coverage) for an optimal TSM. Due to the lack of comprehensive experimental data in the use of TSMs, a thermodynamic adsorption/desorption model was employed based on solids with high surfaces areas. It was found that a binding energy of 40-120 kJ mol$^{-1}$ was needed to maximize the reversible surface area coverage. Furthermore, this binding energy dictates the need for chemisorption of oxygen to the active site since physisorption binding energies are typically in the range of 1-10 kJ mol$^{-1}$, double that for molecular oxygen ($O_2$). The need for a high surface area material stems from the fact that a surface area fraction of 0.5 was employed, meaning surface atoms make up half of all atoms in the structure. This requires extremely small diameter bulk materials to achieve the desired binding energies reported. Therefore, there is a need for an $O_2$ pumping material. Ideally, a sorption pump for redox cycles (1) has an $O_2$ sorption energy of 40-100 kJ/mol, (2) sorbs on the surface to minimize diffusion, and (3) has a high surface area.

Zeolites offer a wide range of high surface area structures. They are complex three-dimensional structures commonly made up of $TO_4$ (T=silicon [Si], Al, phosphorus [P]) tetrahedra interconnected in many different fashions. As of 2020, the Structure Commission of the International Zeolite Association (IZA-SC) database reports 242 distinct zeolite frameworks known as IZA structures. Each zeolite framework is given a unique three-letter code. One zeolite framework code may have many different chemical compositions. Key considerations for the selection of a zeolite as a TSM are the complexity and porous region or channel size. The more complex a zeolite structure, the more unique sites there are within the structure to facilitate adsorption. Likewise, large pore or channel sizes can aid in adsorption due to configurational entropy effects.

Figure 2A:
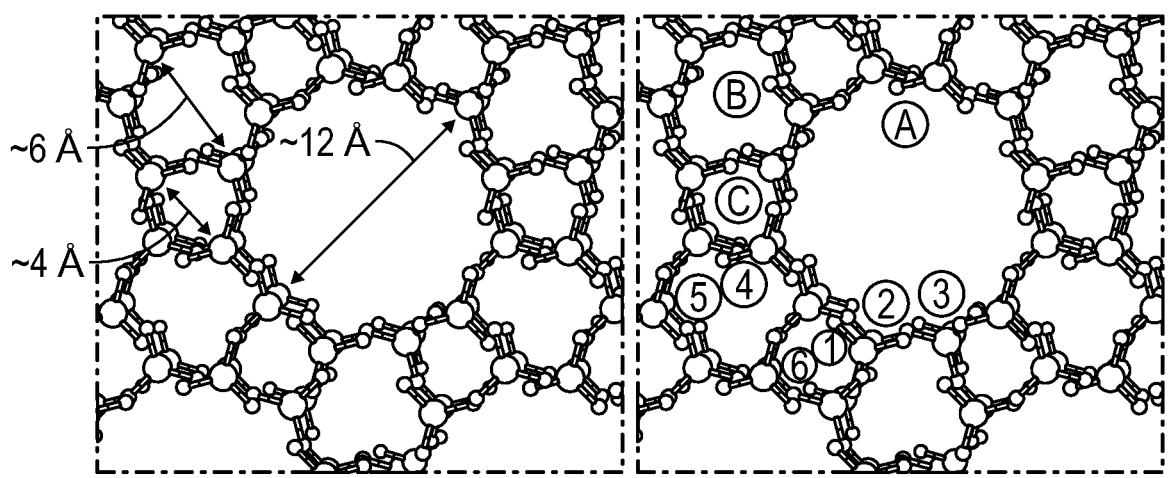
FIG. 2A shows a top view of the AFI structure of ALPO-5 looking down tubular regions.

The present disclosure uses the ALPO-5 zeolite as an exemplar, having the AFI framework. ALPO-5 is considered a large porous material, having at least one pore size greater than ~6 Å. ALPO-5 has a 12-member ring cage system, "12-member," meaning the number of $TO_2$ structures that make up the pore. FIG. 2A shows the ALPO-5 structure. The Al and P atom are both tetrahedrally coordinated, minimizing the steric hindrance for $O_2$ adsorption from neighboring oxygen atoms within the lattice. Phosphorus maintains a +5-oxidation state and Al a +3-oxidation state. Six unique adsorption sites were identified, as illustrated in FIG. 2A, and are discussed subsequently. Additional structures, including but not limited to, substituted VPI-5, SSZ-51, and ALPO-52, also operate as outlined for ALPO-5.

The application of a zeolite structure for use in the desired low oxygen partial pressure and operating temperature ranges is an improved application, and no known zeolite structure currently exits to meet the $O_2$ sorption energy of 40-100 kJ/mol paramount for the temperature/pressure switching environments indicative of solar thermochemical fuel generation. Based on ab initio calculations, the present disclosure demonstrates the feasibility of using zeolites for oxygen pumping. The calculations predict that selective doping of Sn and Cr into the ALPO-5 zeolite provides sites for $O_2$ chemical adsorption energies in the desired 0.41-0.62 eV (40-60 kJ mol$^{-1}$) regime, and 11 other elements provide an adsorption energy range of 0.19-3.92 eV (18-378 kJ mol$^{-1}$). Replacing a system load such as a mechanical $O_2$ pumping device with an $O_2$ absorption material that can use readily available thermal energy can help increase overall system efficiency and can further the progress of the science and application of thermochemical fuel generation.

Computational Methods

Density-functional theory calculations of zeolite structures were conducted in the Vienna Ab Initio Simulation Package under periodic boundary conditions with the Perdew-Burke-Ernzerhof generalized gradient approximation functional. Projector augmented wave pseudopotentials were employed to reduce the computational cost. By way of plane wave expansions projector augmented waves allow the explicit calculation of the 3s and 3p orbitals for Al and P, the 2s and 2p orbitals for O, and the valance electrons for all dopants studied, with some exceptions. Where a transition metal contains full f orbitals, the f orbitals are not explicitly calculated as they are not expected to partake in bond formation. Similarly, the main group elements Sn and gallium do not include the full d orbitals. For the case of the lanthanides cerium and praseodymium along with the 4f, 5d, and 6s orbitals, the 5s and 5p orbitals are explicitly calculated Lastly, zirconium 4s, 4p, 5s, and 4d orbitals are explicitly calculated. Wave functions are represented as a summation of plane waves with energies up to 500 eV. The value 500 eV was chosen after determination that there is only a 1E-08 eV difference in adsorption energy between 500 eV and 600 eV.

The Brillion zone was sampled only at the Γ-point. Convergence studies found only a 0.026 eV difference between a 2×2×2 Monkhorst Pack k-point mesh and Γ-point only calculations at the determined 500 eV cutoff. In an exergy analysis to be discussed subsequently the hybrid functional HSE06 was used to more accurately predict band gap energies within the systems. Generalized gradient approximation tends to underestimate bandgap energies due to the semilocal treatment of the exchange-correlation energy (XC) of electrons within the functional. HSE06 instead mixes a non-local XC with the aforementioned semilocal XC, creating a far better estimation of the exact exchange energy for electrons within the system.

Adsorption energies are calculated by Equation 4:

$$E_{O2\_ads} = E_{ads} - (E_{base} + E_{O_2})$$   EQ. 4 where $E_{O2\_ads}$ is the adsorption energy for $O_2$; $E_{ads}$ and $E_{base}$ are the calculated structure energies for $O_2$ adsorbed to the surface and the base structure with no molecular oxygen present in the system, respectively; and $E_{O_2}$ is the energy of the ground state, non-electronically excited, oxygen molecule calculated in vacuum. A negative adsorption energy indicates an exothermic adsorption process.

Results and Discussion

Base ALPO-5

The zeolite ALPO-5 was selected as a proof-of-concept material. Of the readily available materials, ALPO-5 has the highest surface area with the least number of unique sites to be studied. Rather than selecting a zeolite with three or four different elements within the structure, ALPO-5 only has only two, allowing for a more extensive study of perturbations to this material.

The ALPO-5 structure lattice constants were calculated as a=b=14.09 Å, c=9.72 Å, and angles α=β=90° and angle γ=120°. The defining AFI pores lie in the ab plane, thus generating the tubular region along the c axis. The resulting space group is P6cc. These lattice parameters and space group agree with previously calculated and experimentally determined values with slight deviations (<0.5 Å) in the lattice constants. The three pore regions made up of 4-, 6-, and, 12-ring members are coincidentally 4 Å, 6 Å, and 12 Å in diameter, respectively. Bader charge analysis sets the baseline charge densities for O, Al, and P within the unperturbed system for future comparison as 7.55 eV, 0.51 eV, and 1.24 eV, respectively. The bader charge represents the calculated electronic charge density around the atom. These values coincide with expected oxidation states of $O^{2-}$, $Al^{3+}$, and $P^{5+}$. ALPO-5 has three distinct regions, labeled A, B, and C in FIG. 2A. In each region either an Al or a P can be replaced with a dopant, and oxygen adsorbed thereonto. This leaves six unique total labeled sites 1 to 6.

Figure 3A:
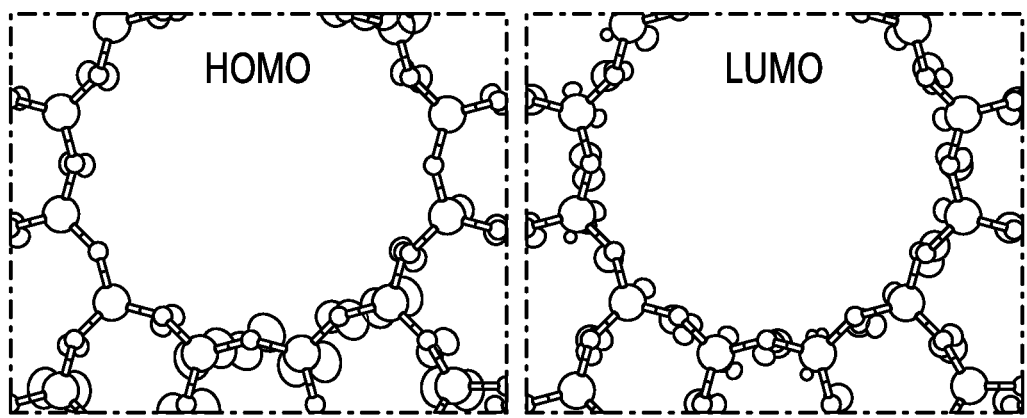
FIGS. 3A, 3B, and 3C illustrate the highest occupied molecular orbital/lowest unoccupied molecular orbital (HOMO/LUMO) iso-surfaces of base ALPO-5 with no $O_2$ present in system, with $O_2$ present in void, and with $O_2$~2 Å from an aluminum atom in the site 3 position, respectively.
Figure 3B:
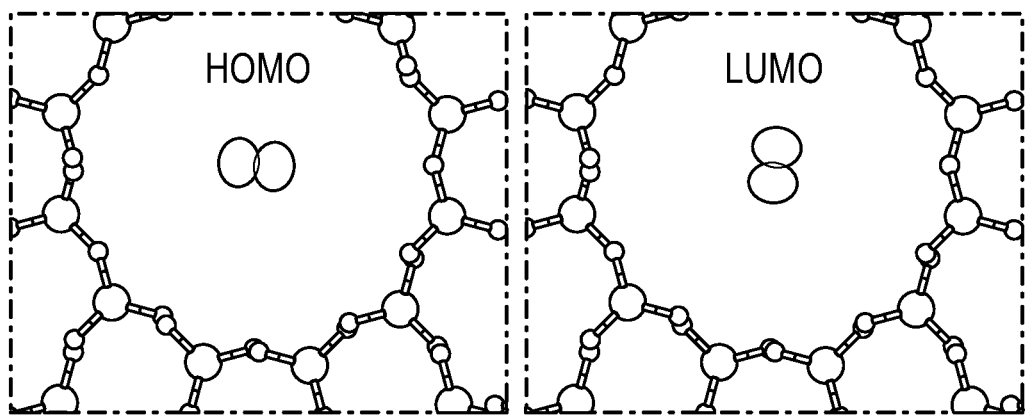
Figure 3C:
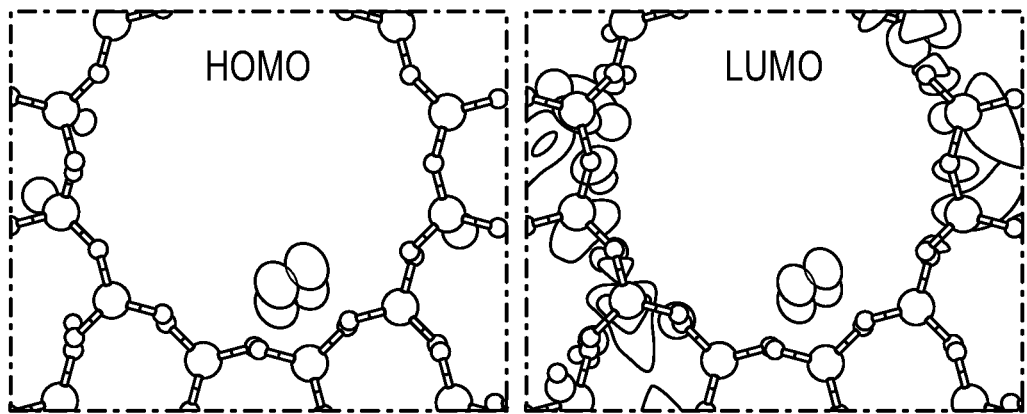
Figure 3D:
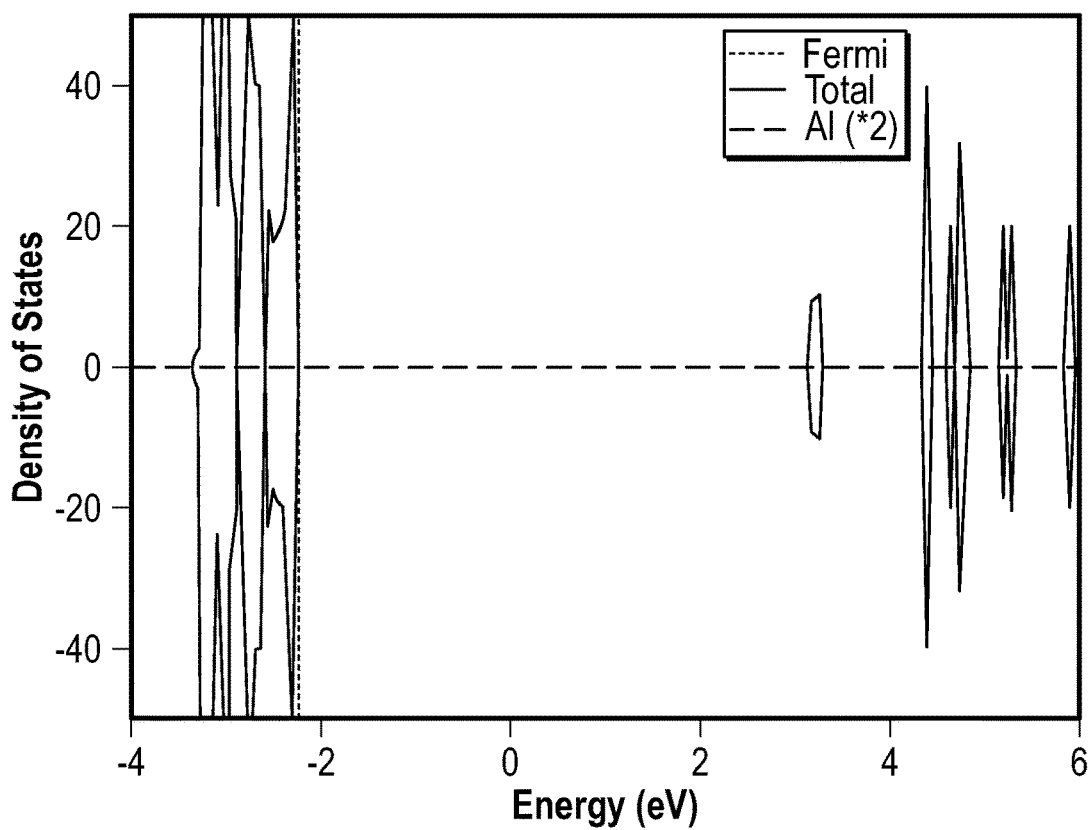
FIGS. 3D, 3E, and 3F show density of state (DOS) associated with FIGS. 3A, 3B, and 3C, respectively.
Figure 3E:
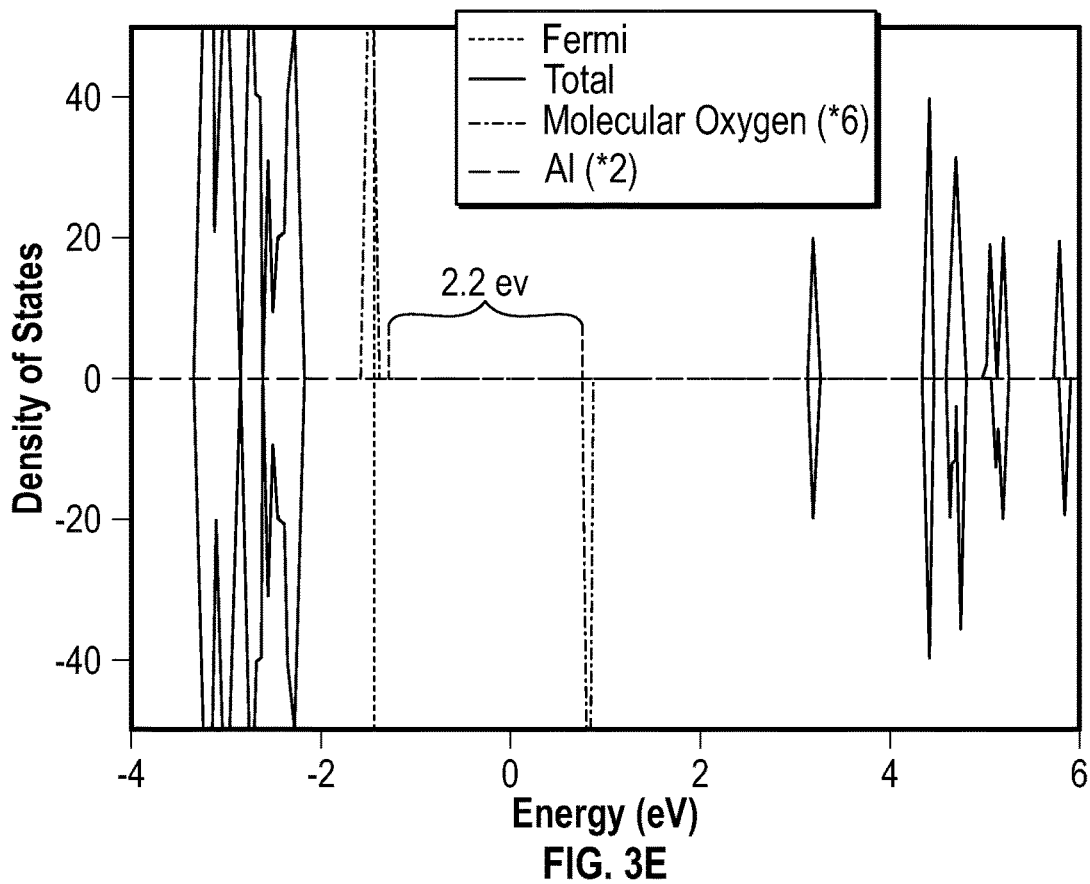
Figure 3F:
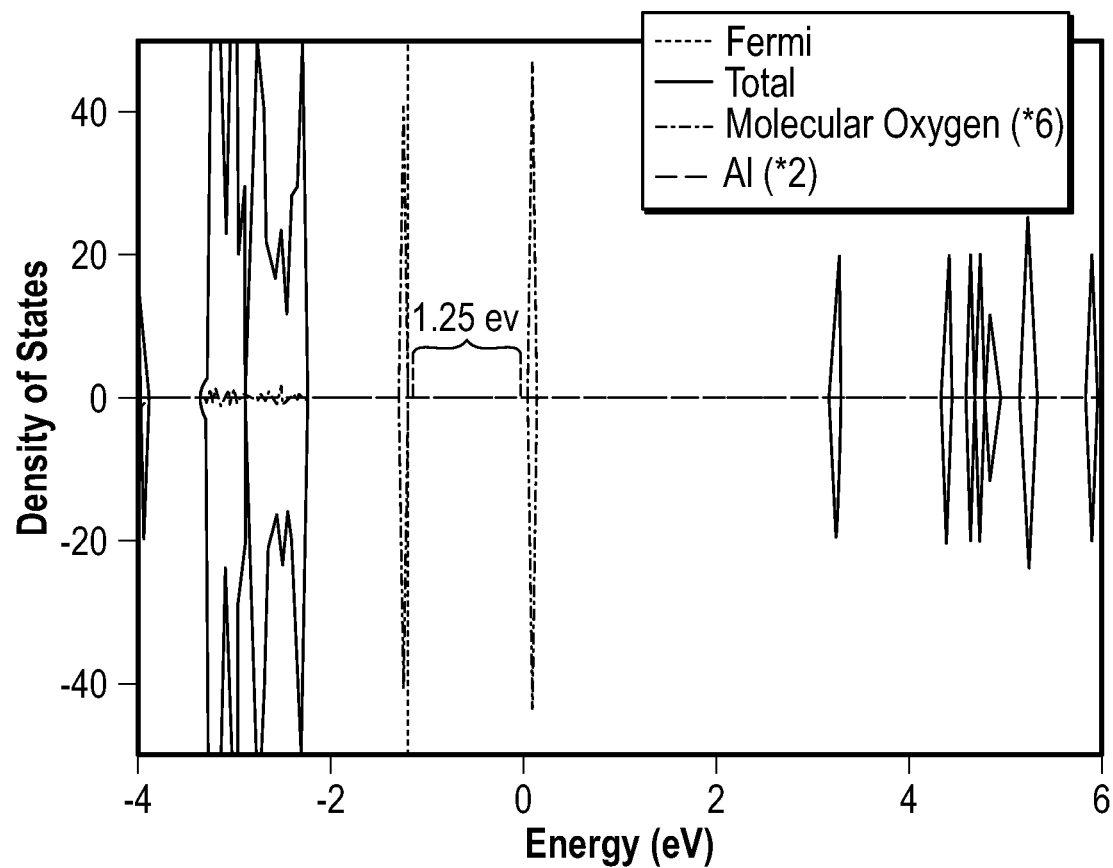

Calculations show that $O_2$ does not adsorb to any of the six unique sites within ALPO-5. The process is illustrated in FIGS. 3A to 3F, where one calculation is conducted with no $O_2$ molecule, another with the $O_2$ molecule inserted into the void space, and finally with the $O_2$ molecule placed sufficiently close to the suspected active site. FIGS. 3A to 3C are decorated with the iso-surfaces of the orbitals at the highest occupied molecular orbital (HOMO) and the lowest unoccupied molecular orbital (LUMO). In FIGS. 3B and 3C the oxygen π* occupied and unoccupied states surround the atoms. The key attribute for FIGS. 3A to 3C is the lack of density around the Al atom in site 3 or any Al atom in the structure. Thus, when the $O_2$ molecule is moved close the Al atom, as in FIG. 3C, there is no mixing of states and the $O_2$ molecule does not bond to the Al atom. Accompanying each FIG. 3A to 3C are the associated density of state (DOS) plots of FIGS. 3D to 3F, respectively. The dashed vertical line corresponds to the Fermi level, which always sits at the HOMO energy band. The gap between the HOMO band and the LUMO band is known as the bandgap. In all the DOS plots the total DOS is depicted by solid lines; the molecular $O_2$ is depicted by dash dot lines and is increased by a factor of 6 in order to portray the partial DOS on the same scale. The site for adsorption is indicated by the long dashed line and again is increased by a factor of 2. The DOS plot energy values are normalized to an O 1S orbital to allow for direct comparison. In the first DOS plot, FIG. 3D, there is a clear lack of Al density peaks near the Fermi level or in any slightly higher energy levels above the HOMO band. When molecular oxygen is introduced into the void, the $O_2$ molecules in occupied and unoccupied π* bands make up the HOMO and LUMO levels, as seen by the two (dash-dot) peaks in FIG. 3E, one up representing spin up occupancy, and one down representing spin down occupancy. Again, note the lack of any Al density peaks near the Fermi or LUMO bands. Finally, in FIG. 3F when the $O_2$ molecule is sufficiently close (~2.0 Å) to the Al site, the bandgap between oxygen π* states is reduced, but with no Al density available to mix with, no bond can be made. To further ensure that no interaction is taking place between the oxygen and Al atoms, a bader analysis was conducted. The initial Al bader charge mentioned previously was 0.51 e. When the $O_2$ molecule sits next to the Al atom, there is no change to the bader charge, indicating no exchange of electron density, which is indicative of no bond formation.

Platinum-Doped ALPO-5

Figure 2B:
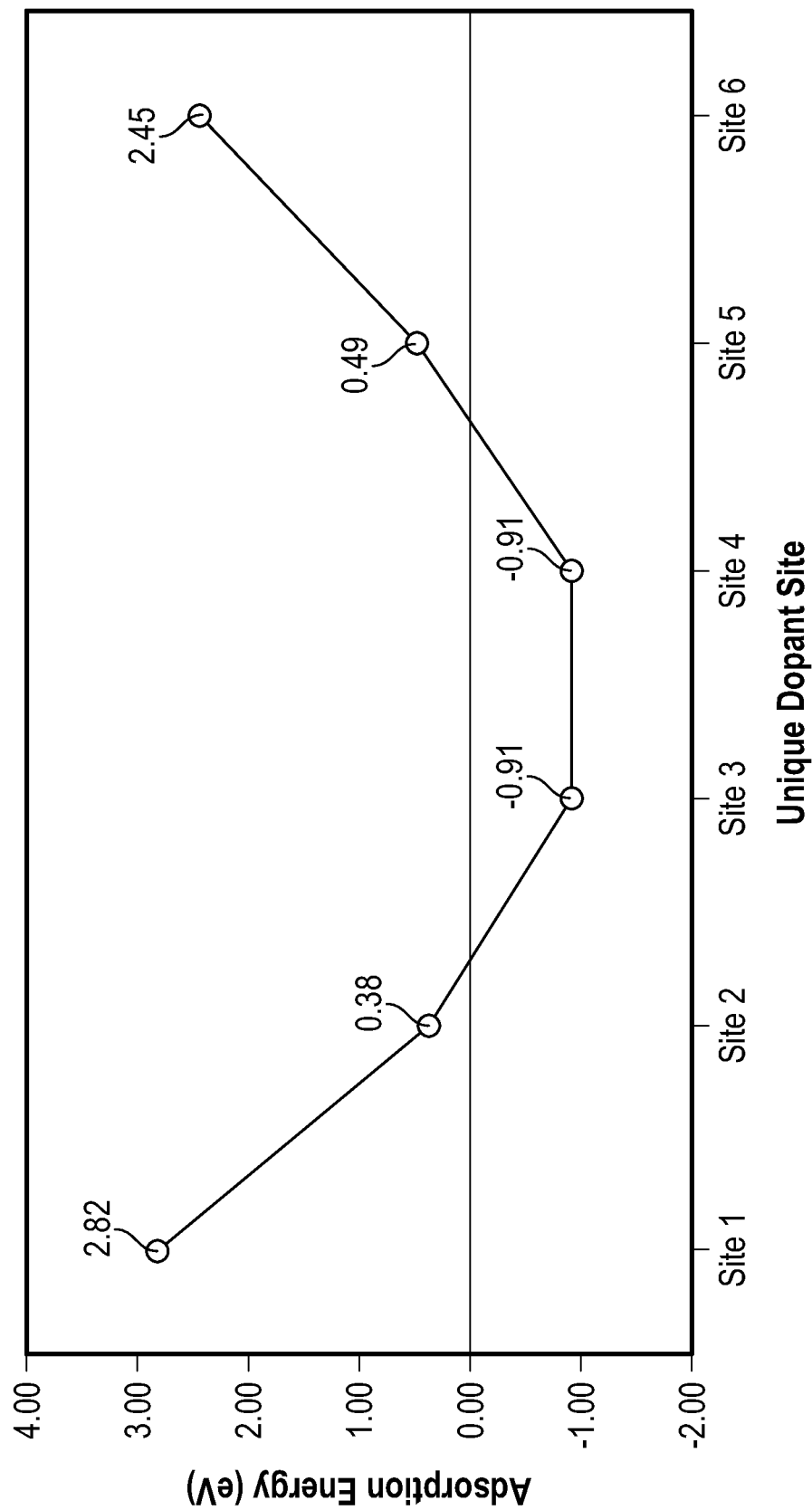
FIG. 2B is a graph that conveys the oxygen adsorption energies for platinum (Pt) doped into each of the unique sites mentioned.

To inject high electron density states needed for $O_2$ adsorption, doping, or substitution, of the material is required. As a proof of concept, platinum (Pt) was selected because of its known high work function which facilitates oxygen adsorption. Dopant sites 2, 5, and 6, shown in FIG. 2A, are locations where Pt substitutes P and 1, 3, and 4 where Pt substitutes Al. Tubular region diameters are illustrated at the left; the three distinct tubular regions and six possible dopant site locations for oxygen adsorption are labeled at the right. The calculated oxygen adsorption energy for each site is shown in FIG. 2B. Sites 1 and 6 contain the highest adsorption energy requirements, which is suspected to be due to the tight environment of region C only having ~4 Å at its furthest diameter. Of all six sites, sites 3 and 4 both have a negative adsorption energy of ~0.91 eV. This means that adsorption is an exothermic process and that the adsorption is within the desired energy range.

Figure 4A:
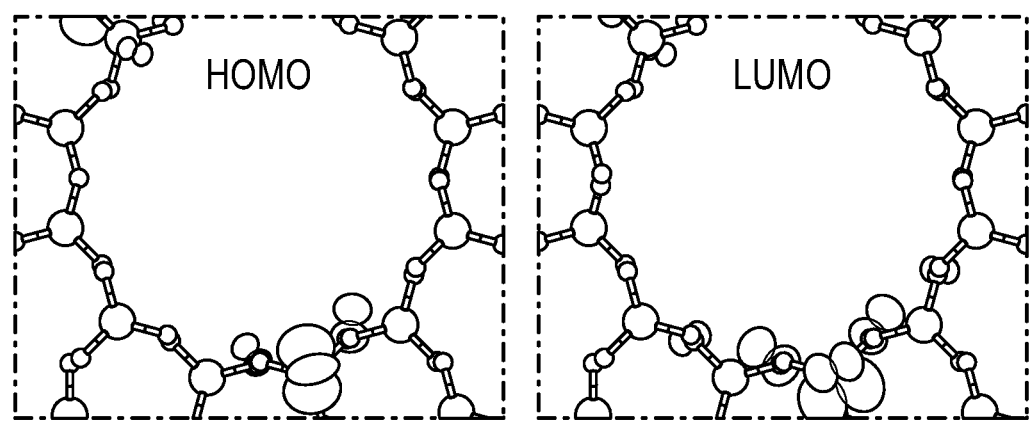
FIGS. 4A, 4B, and 4C illustrate HOMO/LUMO iso-surfaces of site 3 Pt doped ALPO-5 with no $O_2$ present in system, with $O_2$ present in void, and with $O_2$ adsorbed onto Pt in the site 3 position, respectively.
Figure 4B:
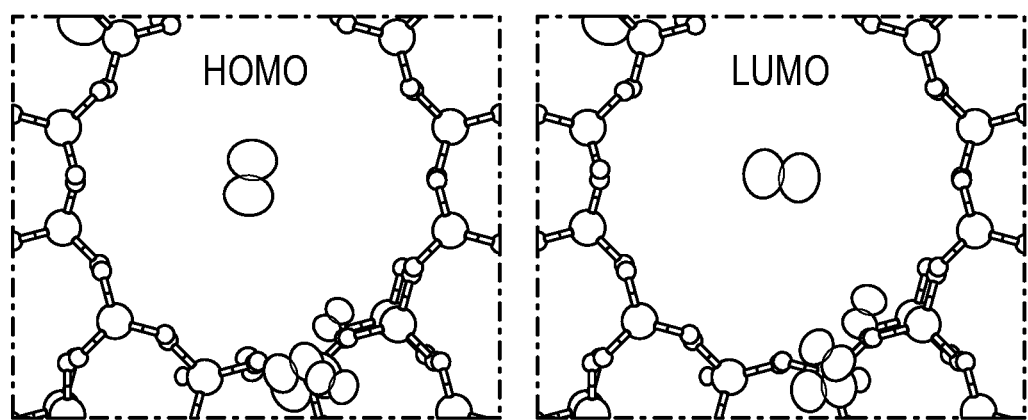
Figure 4C:
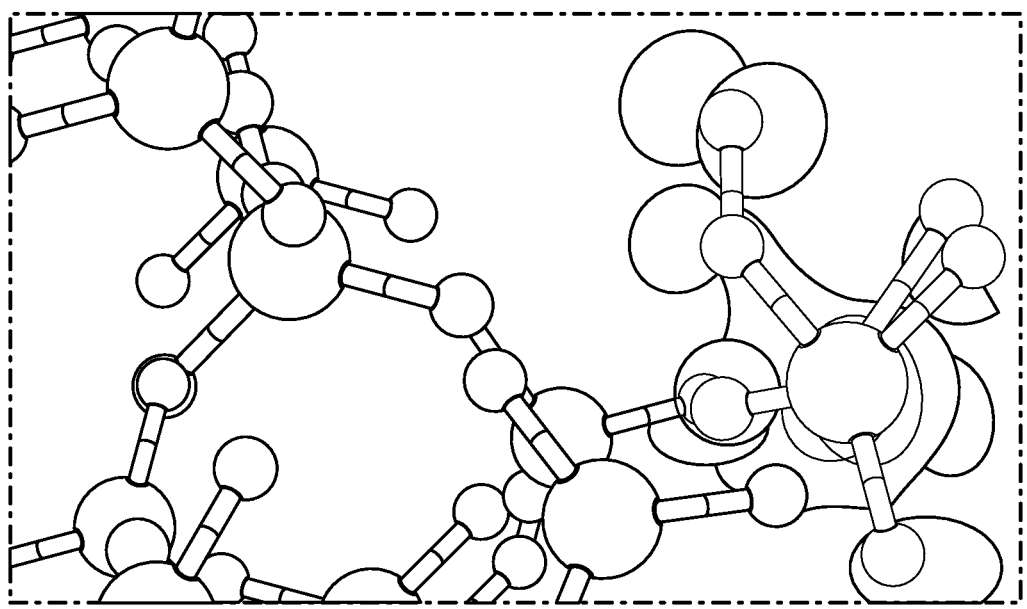
Figure 4D:
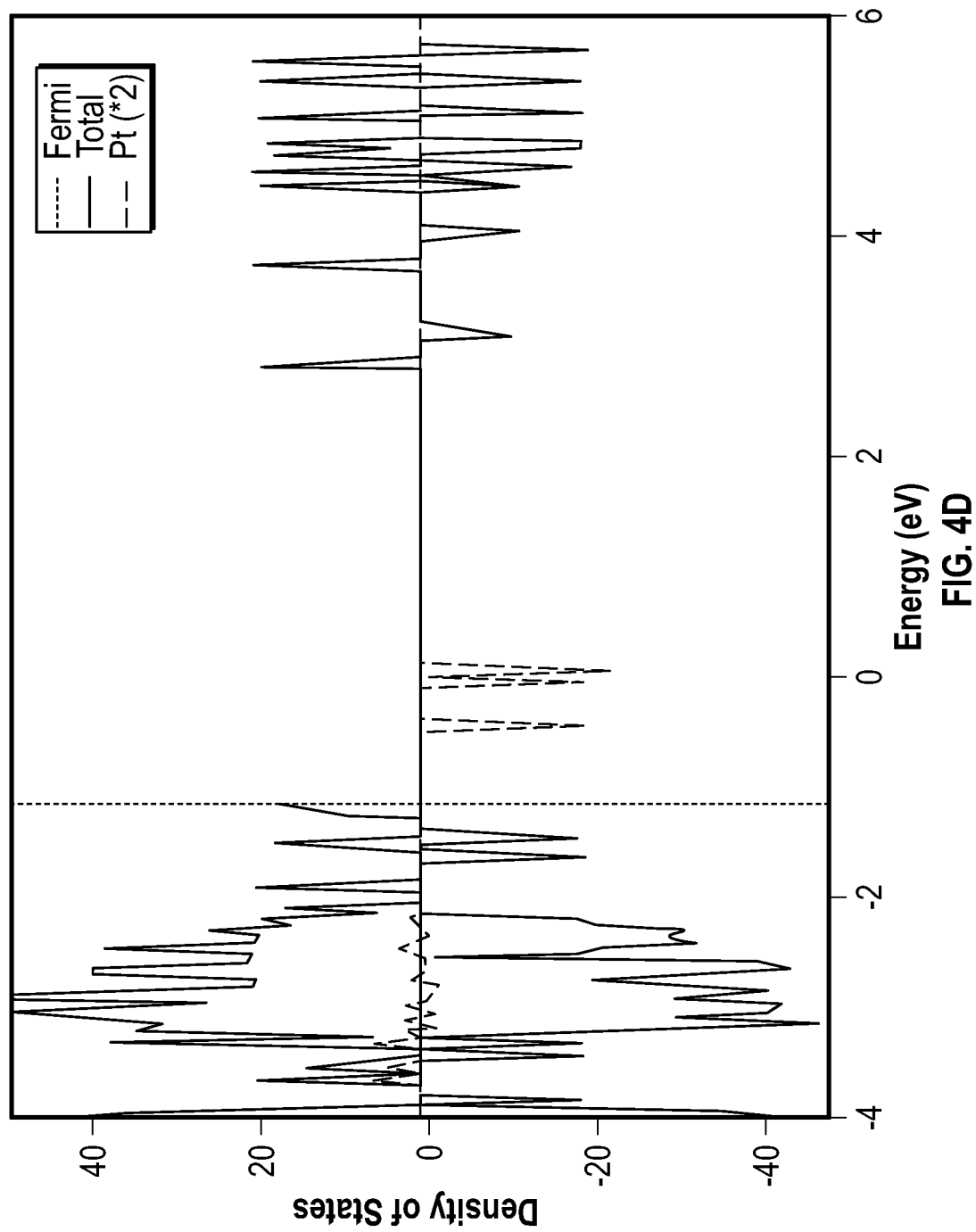
FIGS. 4D, 4E, and 4F show DOS associated with FIGS. 4A, 4B, and 4C, respectively.
Figure 4E:
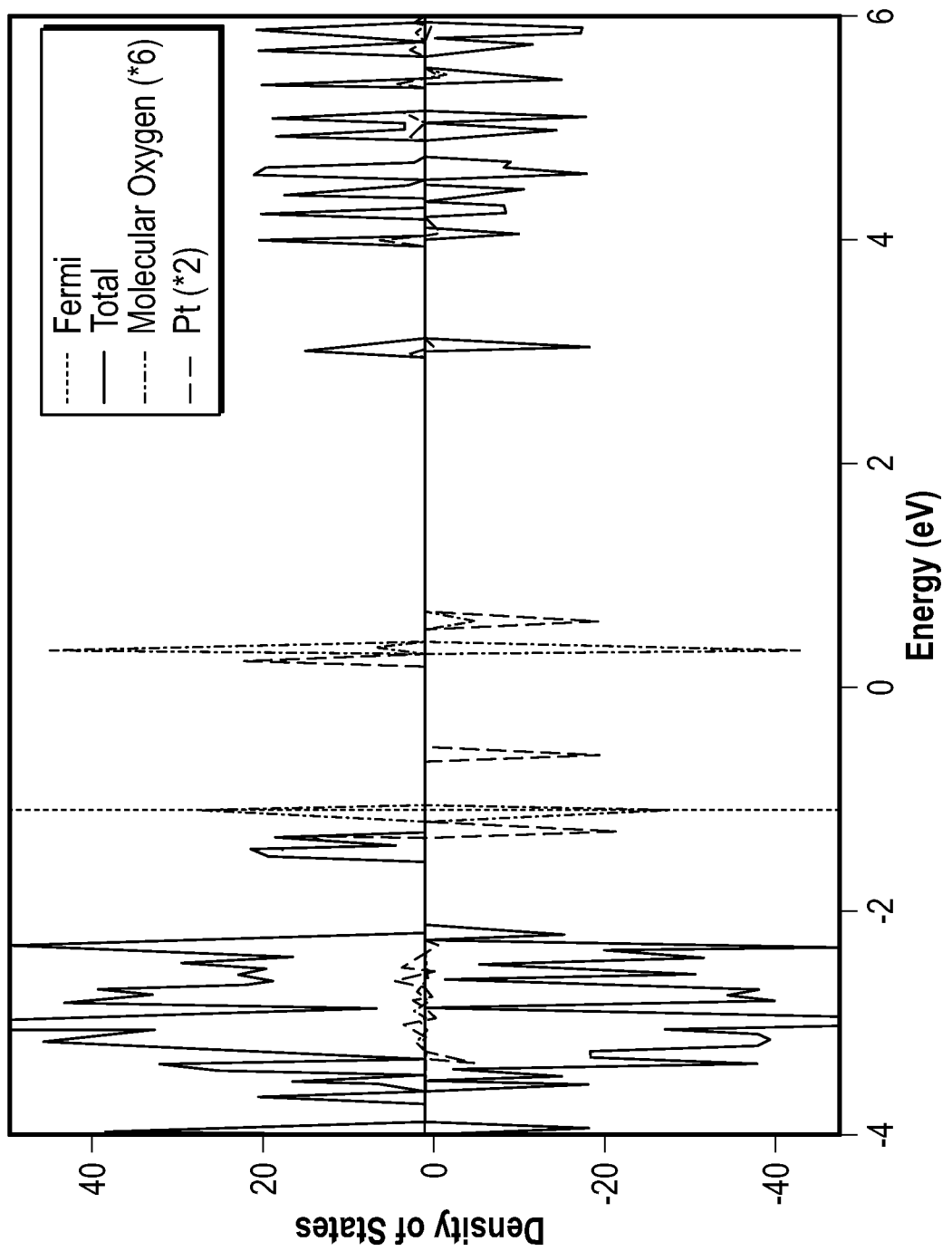
Figure 4F:
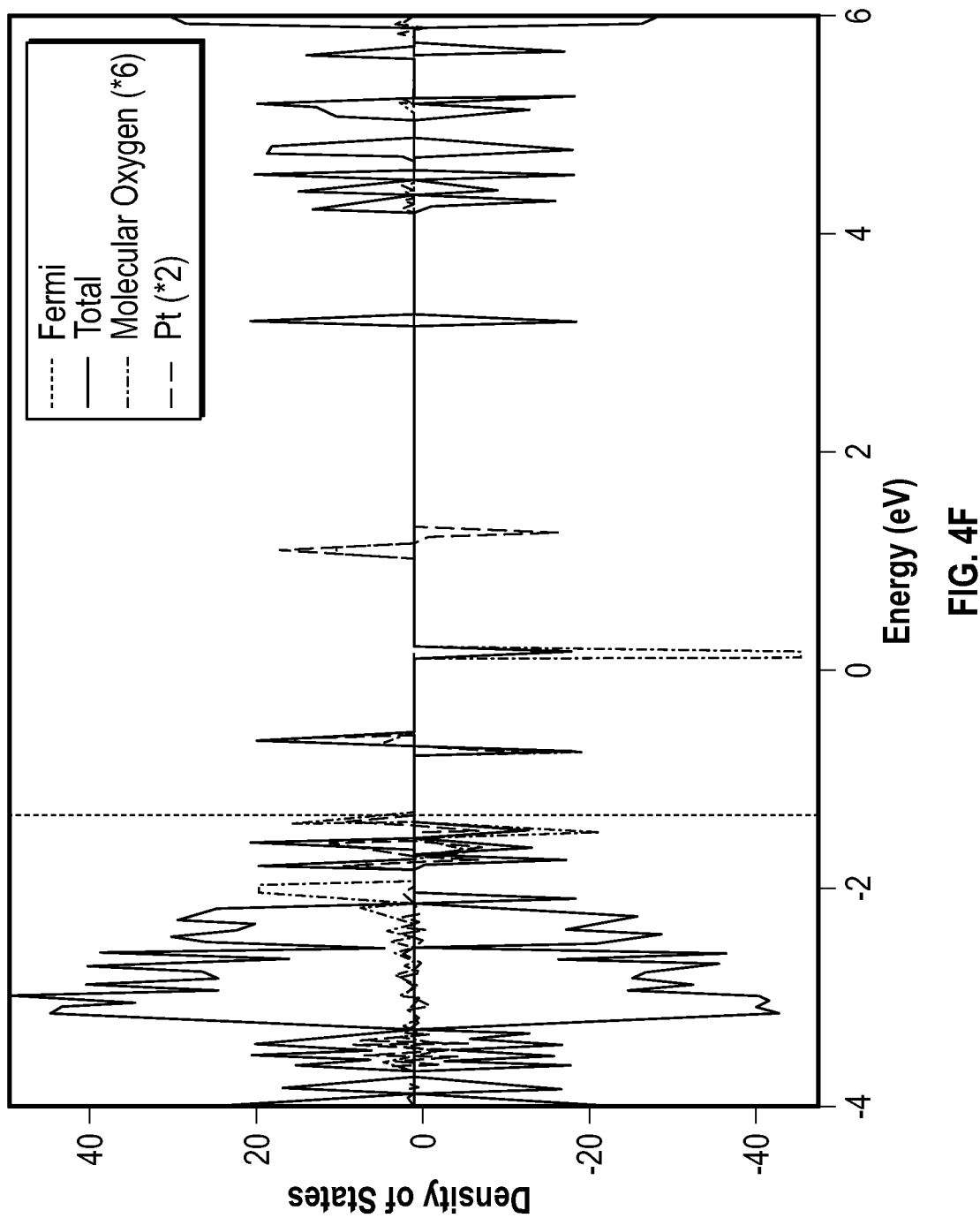

In a manner similar to that used for the un-doped ALPO5 case, $O_2$ adsorption at Pt doped site 3 was examined. There is no discernible difference between the adsorption of $O_2$ onto a Pt located in the site 3 and site 4. These adsorption processes onto Pt are illustrated in FIGS. 4A to 4F and are again decorated with iso-surfaces of the HOMO and LUMO band orbitals in FIGS. 4A to 4C. FIG. 4A clearly shows that Pt contains high energy d orbital electrons that make up the HOMO and LUMO bands. This is further described in the accompanying DOS plot of FIG. 4D, where the density peak at the Fermi level is made up of the Pt d-orbital electrons. The solid line indicates total DOS, the long dashed line is Pt in site 3 DOS, and the short dashed line is the oxygen 1 and 2 DOS in the molecular oxygen. These high energy electrons are present in every iso-surface depicted. In FIG. 4B, when the $O_2$ molecule is present in the void, again the occupied oxygen $\pi^*$ states make up the HOMO band, which is present in iso-surface illustration and noted by the dotted peak at the Fermi level of the accompanying DOS plot in FIG. 4E. However, near the HOMO energy level there are also the partially filled Pt d orbitals along with mid-gap states between the occupied and unoccupied oxygen $\pi^*$ states. These mid-gap states are shown in the DOS plot as the Pt peaks between the occupied oxygen $\pi^*$ states that make up the Fermi energy and the unoccupied oxygen $\pi^*$ states seen as the next dotted peak. These Pt energy states both near the occupied oxygen $\pi^*$ states and the mid-gap states play an important role in determining if the $O_2$ molecule will bond to the active site. When the $O_2$ molecule is moved close to the Pt active site, the occupied oxygen $\pi^*$ states can occupy a lower energy level when mixed with the partially filled Pt d and s orbitals. The unoccupied oxygen $\pi^*$ states are then also mixed with the unoccupied or partially occupied Pt orbitals. This mixing is evident in the iso-surface illustration and the DOS plot by overlapping dot-dashed line (oxygen) and long dashed line (Pt) density peaks and Pt dxy–$O_2$ pz $\pi^*$iso-surface overlap found at the fermi level energy band in FIGS. 4C and 4F, respectively. This shows the presence of a chemical bond between $O_2$ and Pt. This is further seen in the 1.26 Å bond distance of the $O_2$ moiety, which is indicative of the peroxide $O_2$-oxidation state. Finally, a bader analysis is used as further evidence of bond formation. The change in bader charge for Pt between the base and adsorbed state is 0.13 e (a positive change indicates donation by Pt of a charge to the $O_2$ molecule). This is further indication of bond formation. The success of doping with Pt indicates that other, less expensive dopants may be found.

Menu of Dopants

Figure 5:
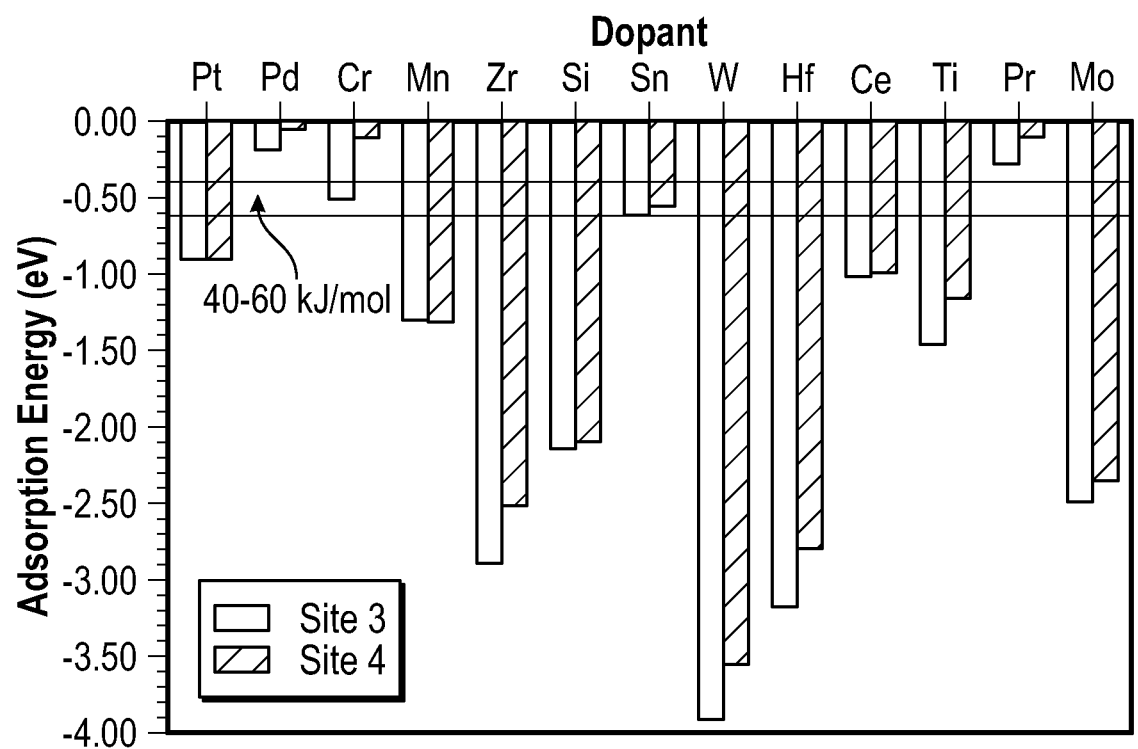
FIG. 5 is a graphic showing a menu of 13 dopants with $O_2$ adsorption energies in sites 3 and 4.

Twenty dopants doped into the ALPO-5 structure were tested. Of these, 13 resulted in $O_2$ adsorption on sites 3 and 4. This is a total of 26 different possible adsorption locations. There is a wide range of adsorption energies found with these dopants ranging from −0.19 eV to −3.92 eV. Two dopants in site 3 were found to have $O_2$ adsorption energy within the TSM range of 0.41-0.62 eV, and Cr and Sn were found to have adsorption energies of −0.51 and −0.62 eV, respectively. Tin also has a suitable energy for adsorption of −0.55 eV in site 4; however, further investigation is needed to determine dopant site preference within the structure. FIG. 5 shows a menu of dopants and their oxygen adsorption energies.

Figure 6A:
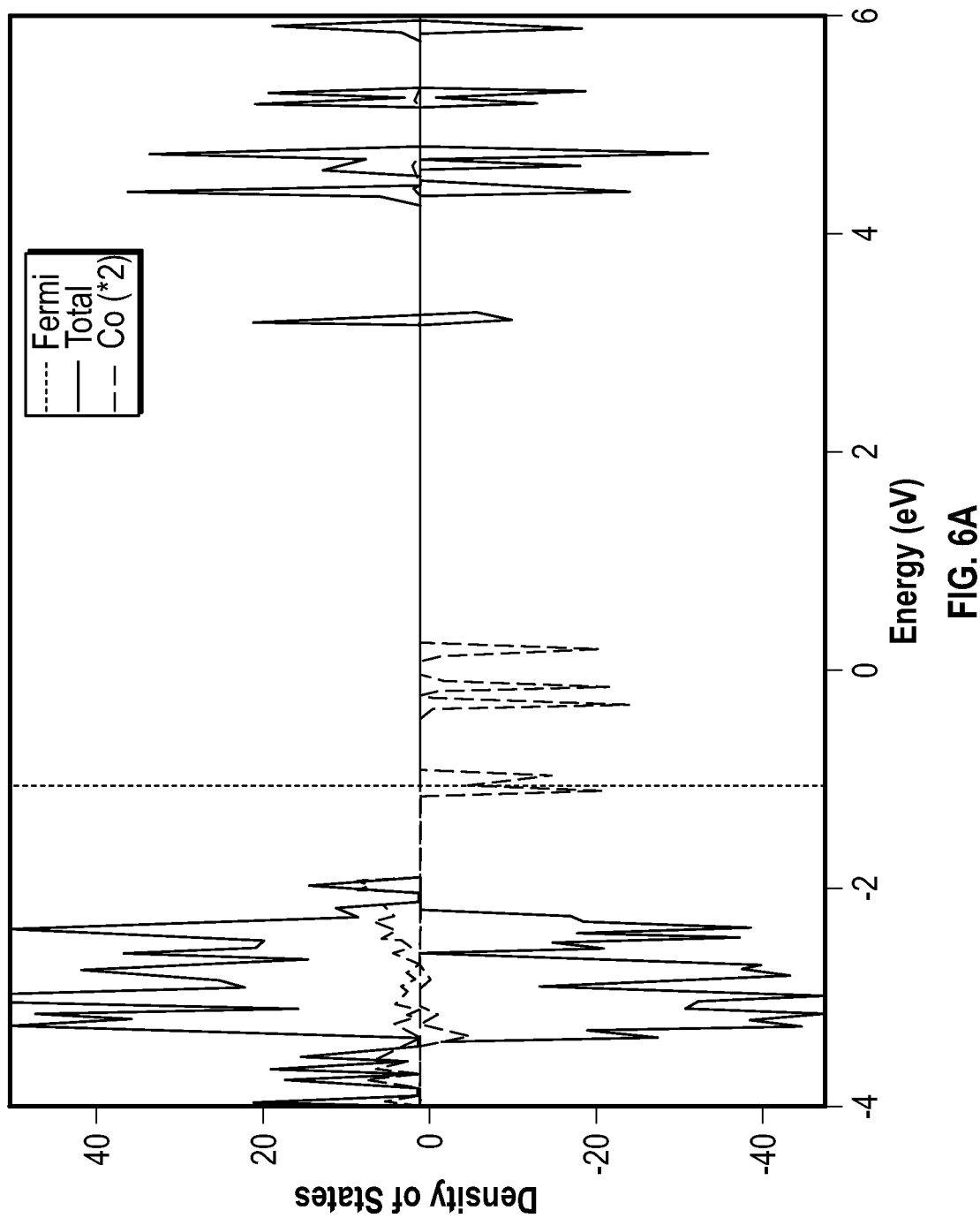
FIG. 6A is a DOS plot showing DOS for cobalt (Co) doped into the site 3 position of ALPO-5 for no $O_2$ in the system.
Figure 6B:
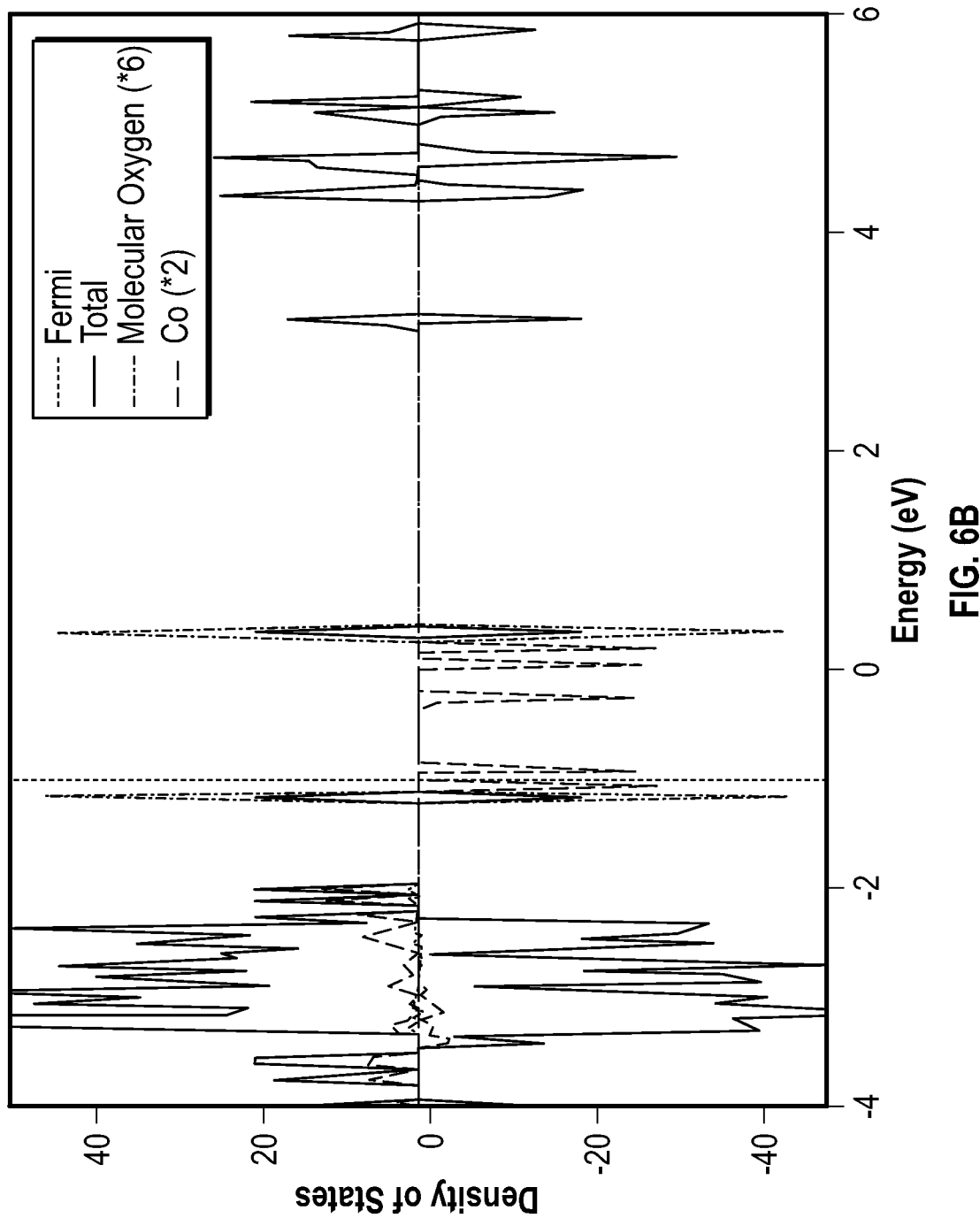
FIG. 6B is a DOS plot showing DOS for $O_2$ located in the void sufficiently far from the Co dopant.
Figure 6C:
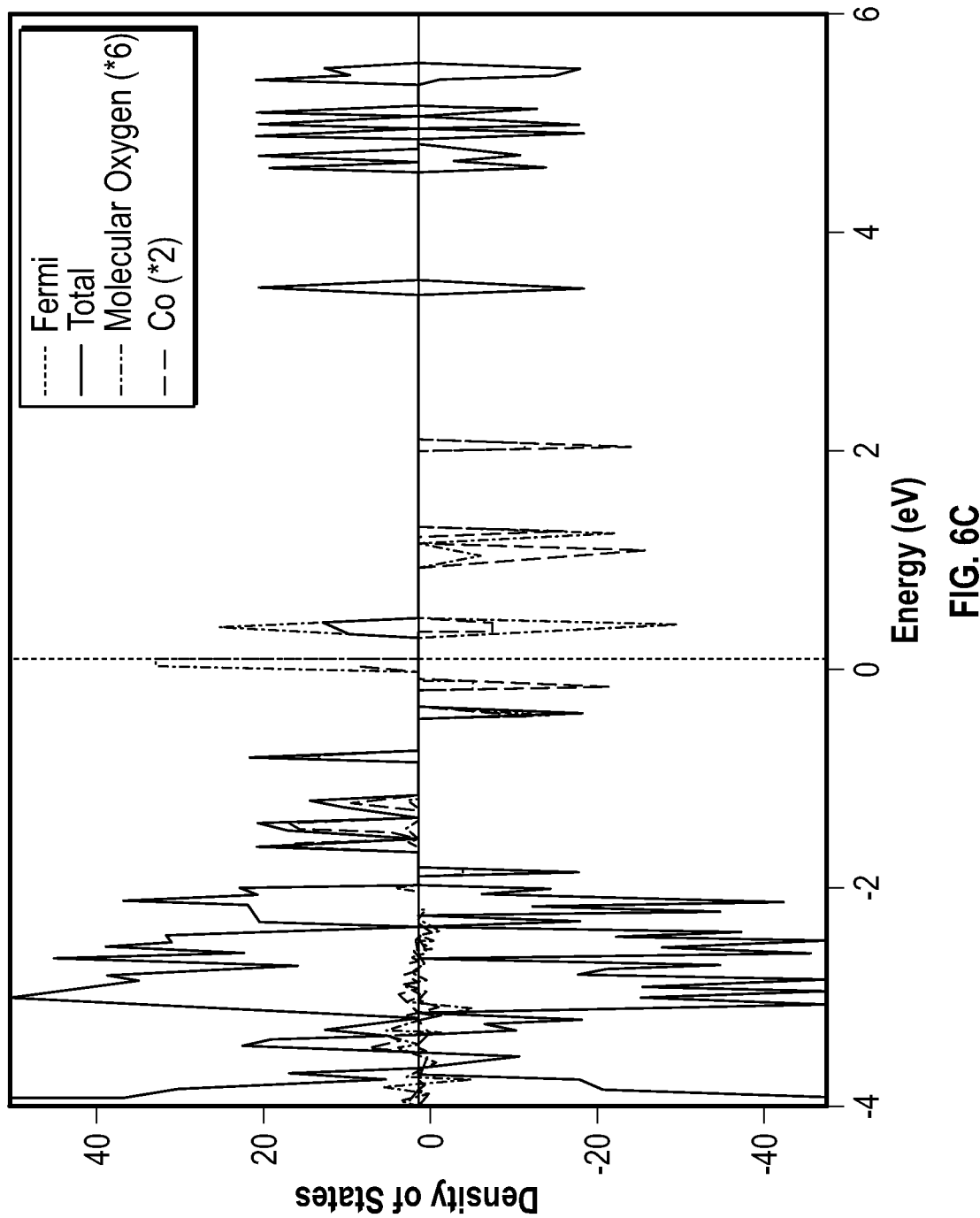
FIG. 6C is a DOS plot showing DOS for $O_2$ sufficiently close to the Co dopant (1.8 Å).

As mentioned previously, not all dopants investigated resulted in exothermic $O_2$ adsorption. While all dopants investigated contain d or f orbital states that contain the density required for oxygen to be adsorbed, some dopant orbital states are too far away in energy from the oxygen $\pi^*$ states. Furthermore, in some dopants available d orbital states are higher in energy, thus resulting in an endothermic process when the $\pi^*$ states mix with the dopant d-orbitals. Cobalt is one such dopant. Cobalt does not result in thermodynamically favorable $O_2$ adsorption, even while inserting the high energy d-orbital states necessary for $O_2$ adsorption. Only the DOS plots are illustrated. FIGS. 6A to 6C illustrate the DOS for Co doped into the site 3 position of ALPO-5 for three cases, respectively: (a) no $O_2$ in the system, (b) $O_2$ located in the void sufficiently far from the Co dopant, and (c) $O_2$ sufficiently close the Co dopant (1.8 Å). The value 1.8 Å was selected because it is close to the same distance that the tetrahedrally coordinated oxygens of Co sit (1.75 Å), but not so close that the $O_2$ molecule interacts with the oxygen atoms within the zeolite structure. It is worth noting for the calculation of the system referenced in FIG. 6C, the $O_2$ would relax to the void; thus, it was required to restrict the $O_2$ molecule from relaxing away from the Co site and ensure only $O_2$—Co interaction was taking place at this distance.

As shown in FIG. 6A, Co d orbital states are located at the Fermi level and mid-gap states are located just above the Fermi energy. However, FIG. 6B shows why $O_2$ will not bond with Co. The Fermi level is made up of the Co d-orbitals, which sit higher in energy than the $O_2$ $\pi^*$ orbitals. This is different from the case described previously in which the Pt d orbital was lower in energy. Therefore, when the $O_2$ is moved close to the Co atom and the orbitals are forced to mix, a jump in the Fermi energy level occurs instead of a decrease, such as in the case when Pt is mixed with $O_2$. This means that it requires energy for the bond formation and thus is an undesired reaction process. A bader analysis was conducted to determine how charge was displaced through the structure when $O_2$ was moved close to the Co site. Unlike the case for Pt, where there is clear charge transfer between the Pt and $O_2$, the Co maintains the charge it had when $O_2$ was sitting in the void. Instead, the charge is displaced through the Co to the tetrahedrally coordinated O atoms (atoms 8, 16, 35, and 43). Atom 8, which sits on the exact opposite side of the bonding $O_2$, takes on a large charge increase of −0.18 eV, which is subsequently offset by the other coordinated atoms (atoms 16 and 35) and atom 33, which is shared with the coordination of atom 35 around the P atom neighboring the Co atom. The remaining O atom coordinated with Co (atom 43) is unaffected because the bonding orbital plane is perpendicular to the $O_2$—Co bond made. The bader charge analysis can be seen in FIG. 6D. The structure with no $O_2$ is taken as the base bader charge, with exception to the $O_2$ atoms which are pulled from a separate calculation of $O_2$ in vacuum alone. Negative (positive) values in the table indicate an increase (decrease) in electron charge density associated with that atom. In all, there is a cascading effect where the cations maintain their normal charge density and the inserted charge from the Co atom, forced by the $O_2$—Co bond, is distributed throughout the neighboring 0 atoms within the zeolite lattice.

$H_2O$ Competition

Figure 7:
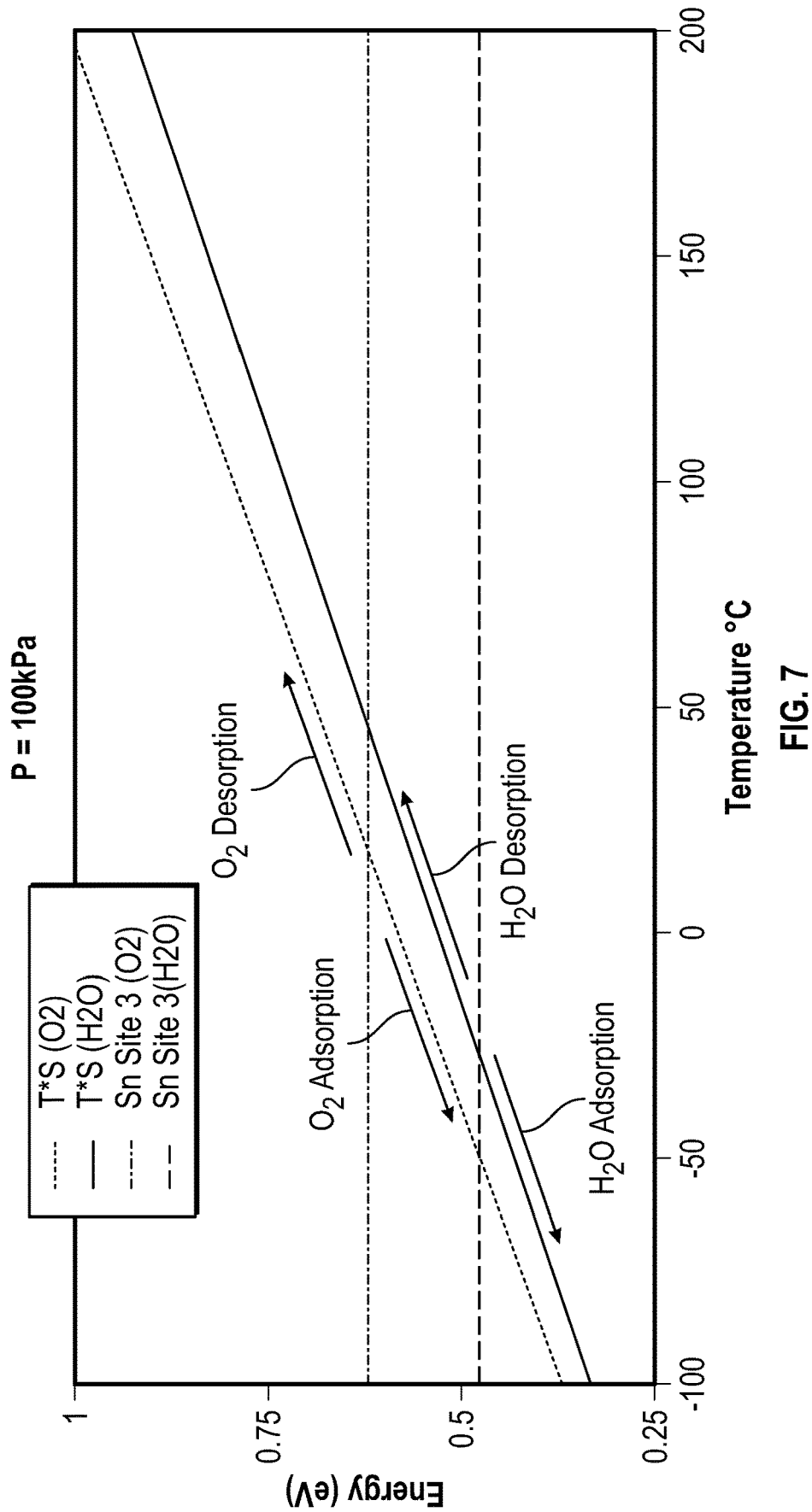
FIG. 7 is a diagram showing exergy analysis of $O_2$ and water ($H_2O$) competition for active sites.

Further analysis was performed to determine if water may have preferential adsorption to the active sites. The competition between $O_2$ and $H_2O$ adsorption was examined on Sn doped at site 3 by comparing the relative enthalpies and entropies of adsorption/desorption. These calculations were conducted using a hybrid functional HSE-06. A Helmholtz exergy analysis was conducted to determine the temperature of adsorption/desorption for $O_2$ and $H_2O$ utilizing standard entropies of 205.15 J·mol$^{-1}$·K$^{-1}$ and 188.84 J·mol$^{-1}$·K$^{-1}$ for $O_2$ and $H_2O$, respectively. Factors such as the number of available active sites and configurational entropy effects are assumed to affect both $O_2$ and $H_2O$ equally. This results in a fortuitous cancellation of the affects and a direct comparison can be made between the two. FIG. 7 shows the temperatures of adsorption/desorption. The thermodynamic desorption temperature, indicated by the crossing of the enthalpic (horizontal lines) and entropic (sloped lines) terms, suggests that $O_2$ binds at higher temperatures than does $H_2O$. By this comparison, $H_2O$ does not compete with $O_2$ for active sites. This indicates that Sn doped ALPO-5 is highly promising for thermochemical $O_2$ sorption pumping.

In the present disclosure, electronic structures of the pure and doped zeolite, ALPO-5, were calculated to explicate the oxygen adsorption capabilities of the material and to ascertain a suitable structure for thermochemical sorption of $O_2$ in the range of ~0.41-1.00 eV (~40-100 kJ·mol$^{-1}$). As expected, pure ALPO-5 does not readily adsorb oxygen. However, it was shown that by substituting one of two sites with a high work function element such as Pt, sufficient energy orbitals are available for molecular oxygens π* states to mix with, resulting in bond formation. Platinum is a relatively expensive dopant. Thus, 20 possible substitutions for Pt were investigated in search of an element resulting in the desired energy range. Thirteen total dopants were found with adsorption energies ranging from –0.19 eV to 3.92 eV. These provide a menu of available structures for a wide range of applications, for example, Sn and Cr, which have adsorption energies of –0.62 eV (–60 kJ·mol$^{-1}$) and –0.51 eV (–50 kJ·mol$^{-1}$), respectively. Furthermore, the competition of $H_2O$ vs. $O_2$ for the Sn doped active site was investigated. The adsorption/desorption temperature of $H_2O$ was shown to be significantly lower than that of $O_2$ (Δ50° C.). Because the desorption temperature of $O_2$ is sufficiently higher, it will not compete with $H_2O$ for the active sites. The method of the present disclosure provides for a low energy cost method for oxygen pumping and thus overcomes one of the key energy sinks and inefficiencies in the overall solar-to-fuel conversion by a thermochemical route.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A material for separating and pumping oxygen, the material comprising a synthetic aluminophosphate zeolite doped/substituted with a chemical element hafnium at an ion location within a framework of the zeolite.

2. The material of claim 1, wherein the chemical element has an adsorption energy of between 40 KJ/mol and 60 KJ/mol.

3. The material of claim 1, wherein the chemical element has an adsorption energy of between 40 KJ/mol and 50 kJ/mol.

4. The material of claim 1, wherein the chemical element has an adsorption energy of between 80 KJ/mol and 120 KJ/mol.

5. The material of claim 1, wherein pores within the zeolite have diameters that are between 4 angstroms and 6 angstroms.

6. The material of claim 1, wherein pores within the zeolite have diameters that are between 6 angstroms and 12 angstroms.

7. The material of claim 1, wherein the zeolite is ALPO-5 zeolite.

8. The material of claim 1, wherein the zeolite is VPI-5.

9. The material of claim 1, wherein the zeolite is SSZ-51.

10. The material of claim 1, wherein the zeolite is ALPO-52.

11. The material of claim 1, wherein the zeolite is configured for controllable oxygen sorption between –20° C. and 80° C.

12. The material of claim 1, wherein the zeolite is configured for controllable oxygen desorption between 100° C. and 300° C.

13. The material of claim 1, wherein the hafnium is substituted on site 3 of an ALPO-5 structure.

14. The material of claim 1, wherein the hafnium is substituted on site 4 of an ALPO-5 structure.

15. The material of claim 1, wherein the hafnium is substituted on sites 3 and 4 of an ALPO-5 structure.

* * * * *